(12) United States Patent
Reich et al.

(10) Patent No.: US 9,827,987 B2
(45) Date of Patent: Nov. 28, 2017

(54) DRIVELINE INPUT TORQUE CONTROL SYSTEM

(71) Applicant: GM Global Technology Operations LLC, Detroit, MI (US)

(72) Inventors: Dennis M. Reich, Howell, MI (US); Craig R. Brooks, Harrison Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/093,809

(22) Filed: Apr. 8, 2016

(65) Prior Publication Data
US 2017/0291609 A1 Oct. 12, 2017

(51) Int. Cl.
| | |
|---|---|
| *B60W 30/18* | (2012.01) |
| *B60W 30/188* | (2012.01) |
| *B60W 10/02* | (2006.01) |
| *B60W 10/06* | (2006.01) |
| *B60W 10/16* | (2012.01) |
| *B60W 10/10* | (2012.01) |
| *B60W 10/14* | (2012.01) |

(52) U.S. Cl.
CPC .... *B60W 30/18172* (2013.01); *B60W 10/023* (2013.01); *B60W 10/06* (2013.01); *B60W 10/10* (2013.01); *B60W 10/14* (2013.01); *B60W 10/16* (2013.01); *B60W 30/188* (2013.01); *B60W 2400/00* (2013.01); *B60W 2710/0666* (2013.01); *B60W 2710/1055* (2013.01); *B60W 2720/26* (2013.01)

(58) Field of Classification Search
CPC ................ B60W 30/188; B60W 30/18172
See application file for complete search history.

(56) References Cited

U.S. PATENT DOCUMENTS

| | | | |
|---|---|---|---|
| 7,650,216 B2* | 1/2010 | Itoh ........................ | B60K 6/44 180/197 |
| 8,483,926 B2* | 7/2013 | Shiozawa ................ | B60L 3/10 303/150 |
| 8,657,389 B2* | 2/2014 | Post, II .................. | B60K 28/16 180/197 |
| 2011/0082634 A1* | 4/2011 | Povirk ................. | B60K 17/344 701/88 |

\* cited by examiner

*Primary Examiner* — Jacob S Scott
*Assistant Examiner* — Tinh Dang
(74) *Attorney, Agent, or Firm* — Cantor Colburn LLP (57) ABSTRACT

A vehicle having a powertrain control system includes an internal combustion engine configured to generate torque, and a transmission to transfer the torque to at least one driveline component of the vehicle. At least one electronic sensor is configured to output a signal indicative of at least one operating parameter of the vehicle. The powertrain control system further includes a vehicle scenario detection module and an electronic control module. The vehicle scenario detection module determines a current vehicle scenario of the vehicle based on the at least one operating parameter. The electronic control module determines a current vehicle scenario based on the at least one operating parameter, to actively determine an active skid-torque value in real-time based on the current vehicle scenario. The control module further generates a torque limiting control signal that adjusts operation of a powertrain system of the vehicle based on the active skid-torque value.

13 Claims, 6 Drawing Sheets

FIG. 1

FIG. 2A $\Sigma F_x = 0:$   $F_{fr} = 0$ $\Sigma F_z = 0:$   $F_f + F_r - W = 0$ $\Sigma M_\alpha = 0:$   $F_r * (\beta + \delta) - W * \beta = 0$ $\Sigma F_x = 0$: $\quad F_{fr} - W * sin(\Theta) = 0$ $\Sigma F_z = 0$: $\quad F_f - W * cos(\Theta) = 0$ $\Sigma M_\alpha = 0$: $\quad F_f * (\beta + \delta) + W * sin(\Theta) * \gamma - W * cos(\Theta) * \beta = 0$

DRIVELINE INPUT TORQUE CONTROL SYSTEM

FIELD OF THE INVENTION

The subject invention relates generally to automotive vehicles, and more particularly, to powertrain systems included in automotive vehicles.

BACKGROUND

Vehicle powertrain systems include an engine that outputs a drive torque to a transmission via a crank shaft. The transmission typically includes a planetary gear arrangement. A plurality of torque transmitting mechanisms in the form of both rotating and stationary clutches and band brakes are adjusted so as to transform the drive torque generated by the engine into multiple forward speed ratios and reverse drive. Conventional powertrain systems typically assign a maximum torque capacity to each of these elements as well as the shafts in the transmission, which when exceeded, may negatively impact or even damage the operation of the powertrain. Thus, conventional powertrain systems operate according to a fixed or static torque-slip value.

Vehicle skid-torque is typically defined as the torque required (i.e., the torque about the axis of the axle shaft, half shaft, etc. of the axle of discussion) to produce a driving force at the point at which the tire is contacting the road surface (i.e., the "contact patch"), that becomes greater than the opposing static frictional force. Overcoming the frictional force (static) will result in a loss of traction. If the frictional forces due to static friction are overcome by the skid-torque, the interaction between the tire and the surface contacting the tire will depend on the kinetic friction characteristics of the two. Generally, the engine and transmission are matched to the fixed skid-torque value such that the torque output by the transmission (i.e., the input torque delivered to the various driveline components) does not exceed maximum skid-torque value regardless of the current vehicle scenario.

SUMMARY OF THE INVENTION

In at least one non-limiting embodiment, a vehicle having a powertrain control system includes, for example, an internal combustion engine configured to generate torque, and a transmission to transfer the torque to at least one driveline component of the vehicle. At least one electronic sensor is configured to output a signal indicative of at least one operating parameter of the vehicle. The powertrain control system further includes a vehicle scenario detection module and an electronic control module. The vehicle scenario detection module determines a current vehicle scenario of the vehicle based on the at least one operating parameter. The electronic control module determines a current vehicle scenario based on the at least one operating parameter, to actively determine an active skid-torque value in real-time based on the current vehicle scenario. The control module further generates a torque limiting control signal that adjusts operation of a powertrain system of the vehicle based on the active skid-torque value.

In another non-limiting embodiment, a vehicle powertrain control system includes at least one electronic sensor and an electronic vehicle scenario detection module. The electronic sensor is configured to output a signal indicative of at least one operating parameter of the vehicle. The vehicle scenario detection module includes including a computer processor configured to determine a current vehicle scenario of the vehicle based on the at least one operating parameter. The vehicle powertrain control system further includes a torque limiting module having a computer processor configured to actively determine an active skid-torque value in real-time based on the current vehicle scenario. The torque limiting module is further configured to generate a torque limiting control signal that adjusts operation of a powertrain system included on the vehicle based on the active skid-torque value.

In still another non-limiting embodiment, a method of controlling a powertrain system included in a vehicle includes generating torque via an engine or motor to drive the vehicle, and transferring the torque via a transmission to at least one driveline component of the vehicle. The method further includes outputting an electronic signal indicating at least one operating parameter of the vehicle. The method further includes determining a current vehicle scenario of the vehicle based on the at least one operating parameter, and actively determining an active skid-torque value in real-time based on the current vehicle scenario. The method further includes adjusting operation of a powertrain system of the vehicle based on the active skid-torque value.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

Conventional solutions intended to protect driveline components from high-torque inputs (i.e., high engine and/or transmission output) rely on a fixed or static input torque limit that is established based on the respective skid-torque calculation for a given vehicle/axle. These conventional fixed or static skid-torque values are calculated based on worst-case scenario data that was determined through CAE analysis or from vehicle-level development testing. For instance, once the resultant worst-case scenario skid-torque value(s) has/have been established, they are compared to the capacities of the associated driveline components and used to determine a fixed driveline input torque limit that is managed through various control methods. Major shortcomings of this approach exist because the fixed skid-torque values may not account for actual worst-case scenario skid-torques and/or it may result in an unnecessary loss of vehicle performance.

Unlike conventional powertrain systems that utilize fixed or static skid-torque values, at least one embodiment of the disclosure reduces stress and aims to protect driveline components from high-torque inputs using active measurement system values as inputs to an equation that describes how skid-torque values change with respect to scenario of the vehicle. The vehicle scenario may include, but is not limited to, the road/surface grade, and direction, in which the vehicle positioned or located. For instance, as a vehicle is exposed to a given grade in a given direction, the weight distribution (between axles) will change, meaning that the skid-torque value for each axle will increase or decrease with respect to the grade and direction of travel. Vehicle load capacities (e.g., gross axle weight ratings) can be determined or measured when the vehicle is on relatively level surface. As the vehicle is subjected to a given grade, however, the axle weights can exceed the maximum posted weight ratings. Consequently, higher than expected skid-torque values can result, which can lead to driveline component failures due to higher than expected tractive forces.

In at least one embodiment, various vehicle characteristics may be obtained to determine a current vehicle scenario. For example, various vehicle sensors may determine characteristics of the vehicle including, but not limited to, yaw rate, lateral acceleration, longitudinal acceleration, steering wheel angle, rotational direction of all four wheels and/or rotational speed of all four wheels. The vehicle characteristics can then be used to determine the current vehicle scenario such as, for example the road/surface inclination, in degrees, at which a vehicle is operating. According to a non-limiting embodiment, the measureable range of the road/surface grade is approximately negative (−) 45°-positive (+) 45°. The accuracy of this range typically depends on vehicle velocity and the resolution/rounding of associated measurements. The current measureable range and accuracy of this system would be sufficient to actively calculate real-time skid-torque values and actively determine the respective driveline input torque limit(s). When the skid-torque during the current vehicle scenario exceeds a skid-torque threshold value, the powertrain system may initiate one or more input torque limiting measures. There are several operations in which the driveline input torque can be managed including, but not limited to, adjusting engine output torque, adjusting transmission output torque, and controlling operation of the transfer case so as to adjust auxiliary output torque (if the vehicle is equipped with an active transfer case and/or has the supporting clutch capabilities). In this manner, the torque efficiency of the vehicle can be maximized during a wide-range of vehicle scenarios, thereby improving the overall performance of the vehicle.

Figure 1:
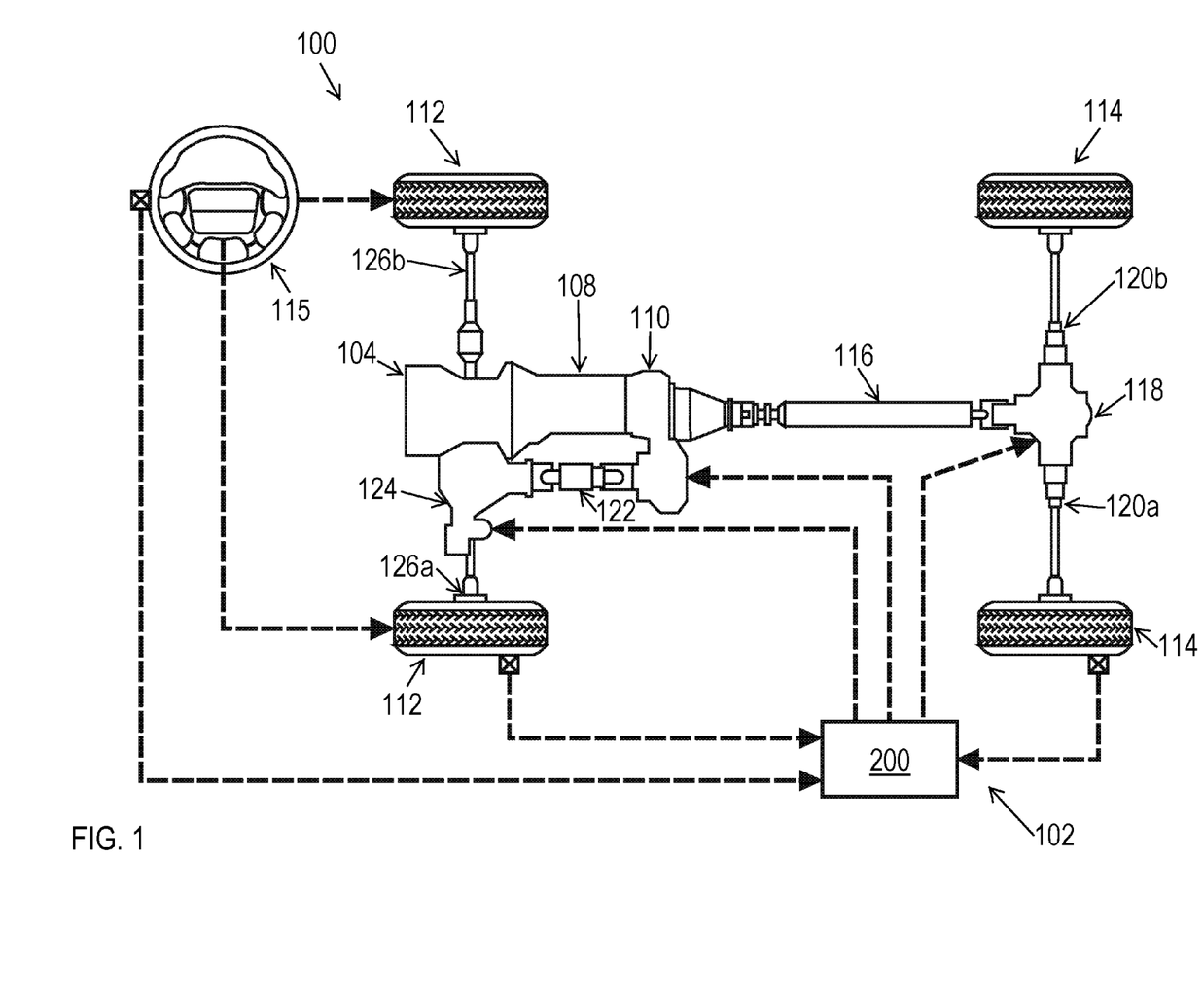
FIG. 1 is a block diagram of a vehicle including a powertrain control system configured to regulate input torque based on a current vehicle scenario according to a non-limiting embodiment.

With reference now to FIG. 1, a vehicle 100, including a powertrain control system 102 configured to actively control driveline input torque, is illustrated according to a non-limiting embodiment. The vehicle 100 is driven according to a powertrain system that, in some examples, includes an internal combustion engine 104, a transmission 108 and a transfer case 110. The internal combustion engine 104 is configured to generate drive torque that drives front wheels 112 and rear wheels 114 using various components of the vehicle driveline. The vehicle driveline may be understood to comprise the various powertrain components, excluding the engine 104. According to a non-limiting embodiment, the drive torque is transferred to the transmission 108 via a rotatable crank shaft (not shown). Thus, the torque supplied to the transmission 108 may be adjusted by controlling operation of the engine 104. The internal combustion engine 104 may include, but is not limited to a diesel engine, a gasoline engine, and electric engine or a hybrid engine (i.e., a combined gasoline-electric engine). The vehicle may further include a steering system that includes a steering wheel 115 configured to adjust the lateral angle of the wheels i.e., steer the front wheels 112 and/or the rear wheels 114 as understood by one of ordinary skill in the art.

The transmission 108 transforms the drive torque generated by the engine 104 into multiple forward speed ratios and reverse drive in response to adjusting one or more clutches. The transmission 108 may include a manual transmission where the clutches are manually adjusted (i.e., shifted by the driver) or an automatic transmission that includes a torque converter to automatically adjust the clutches in response to the driving conditions of the vehicle 100. The transfer case 110 is coupled to the transmission 108, and is configured to transfer the transformed torque output from the transmission 108 to the front and rear wheels 112 and, respectively, 114 using a combination of axles and drives shafts. For example, a rear drive shaft 116 delivers transformed torque to a rear differential mechanism 118. The rear differential mechanism 118 transfers the transformed drive torque differentially to the rear wheels 114 via one or more rear wheel axles 120. In an embodiment, the left rear wheel 114 is rotatably coupled to the rear differential 118 via a left rear wheel axle 120a and the right rear wheel 114 is rotatably coupled to the rear differential 118 via a right rear wheel axle 120b. In at least one embodiment, the rear differential mechanism 118 is configured to selectively deliver a first transformed torque to the left rear wheel 114 and a different second transformed torque to the right rear wheel 114.

A front drive shaft 122 delivers transformed torque to a front differential mechanism 124. The front differential mechanism 124 transfers the transformed drive torque differentially to the front wheels 112 via one or more front wheel axles 126. In an embodiment, the left front wheel 112 is rotatably coupled to the front differential 124 via a left front wheel axle 126a and the right front wheel 112 is rotatably coupled to the front differential mechanism 124 via a right front wheel axle 126b. In at least one embodiment, the front differential mechanism 124 is configured to selectively deliver a first transformed torque to the left front wheel 112 and a different second transformed torque to the right front wheel 112.

The transfer case 110 is also configured to synchronize the difference between the rotation of the front wheels 112 and the rear wheels 114. For example, the transfer case 110 transfers torque to the rear drive shaft 116 when a two-wheel drive operating mode is selected and concurrently transfers the torque to both the rear drive shaft 116 and the front drive shaft 122 when a four-wheel-drive mode of operation is selected.

During operation, the vehicle 100 may continuously realize changing vehicle scenarios. The changing vehicle scenarios include, but are not limited to, changes in the orientation of a vehicle 100 (i.e., from a level surface to a given surface grade), changes in center of gravity upon the vehicle 100, changes in axle weight distribution and/or changes in skid-torque values. Consequently, the vehicle 100 is vulnerable to high-input torque that may stress or damage various driveline components. Conventional powertrain control systems operate according to fixed driveline input torque limits. e.g., a fixed skid-torque value, to protect the driveline components from possible high-input torque. These fixed torque limits, however, are not efficiently employed as the vehicle experiences changing vehicle scenarios. As a result, vehicle performance may be unnecessarily limited.

Unlike conventional powertrain control systems, at least one embodiment of the disclosure provides a powertrain control system 102 configured to actively control driveline input torque (i.e., transmission output) based on a current vehicle scenario such as, for example, the surface grade and/or orientation of the vehicle. In this manner, the appropriate input torque may be actively provided during a wide range of vehicle scenarios. In addition, unnecessary limitations on input torque may be avoided so as to improve the overall vehicle performance.

Figure 2A:
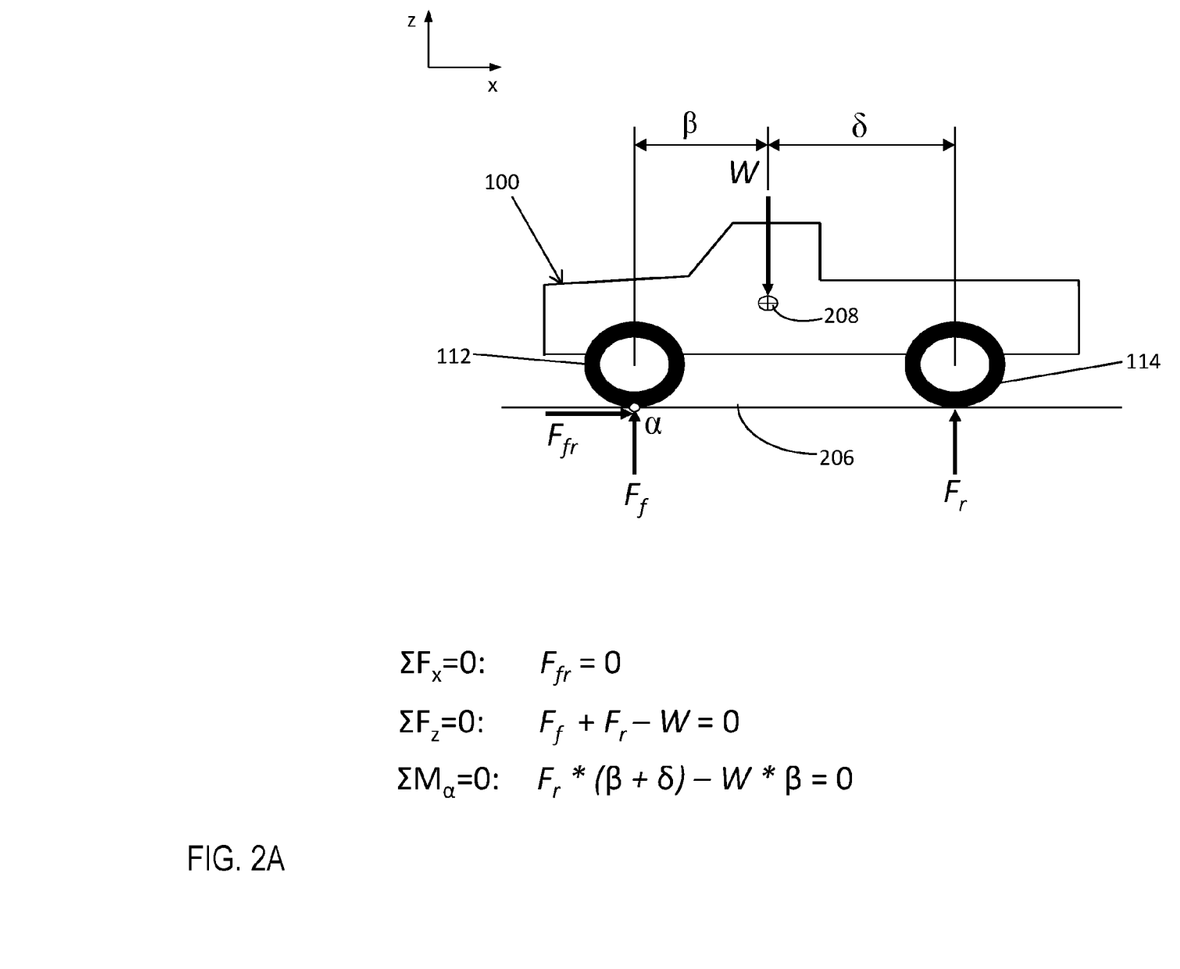
FIG. 2A illustrates a first vehicle scenario where the vehicle is located on a flat or substantially flat surface.
Figure 2B:
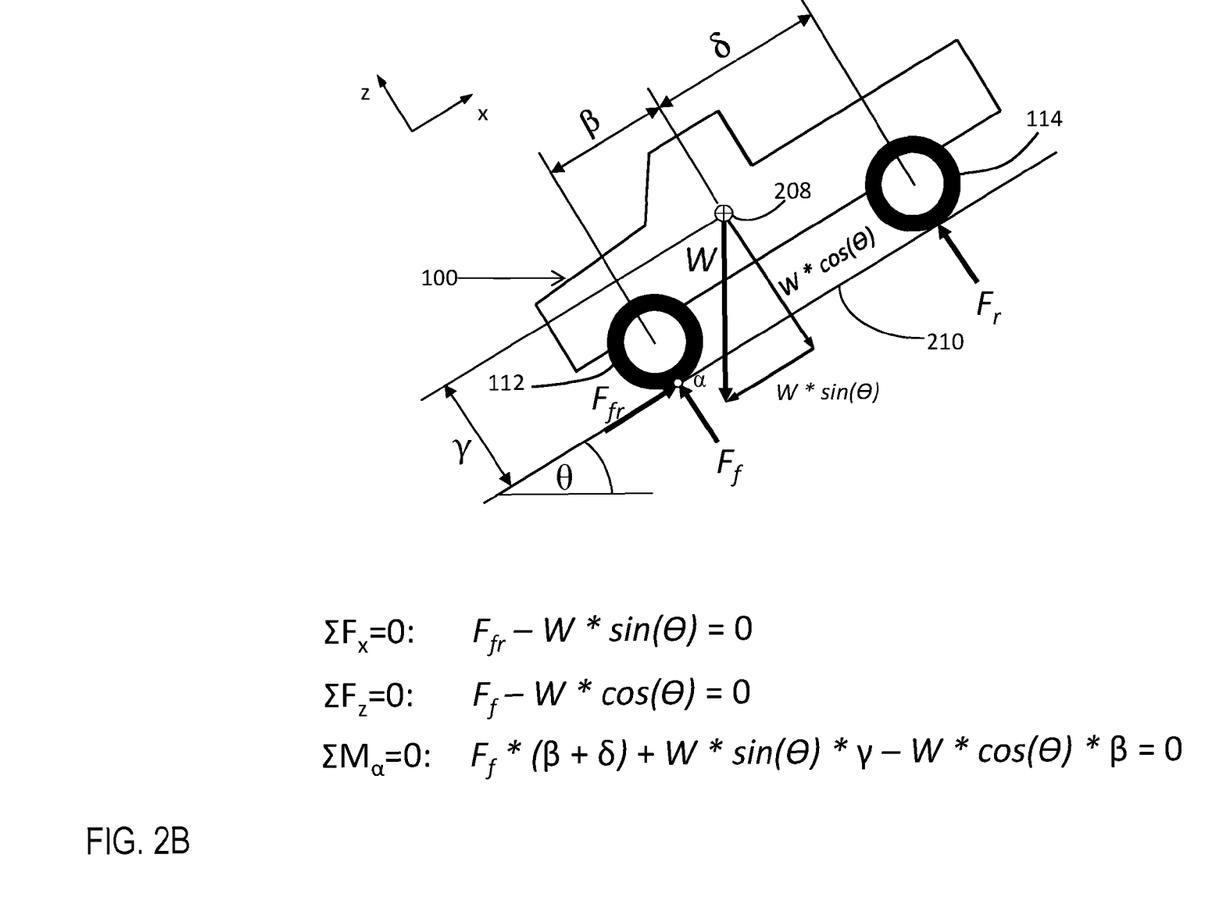
FIG. 2B illustrates a second vehicle scenario where the vehicle is located on an inclined surface.
Figure 3:
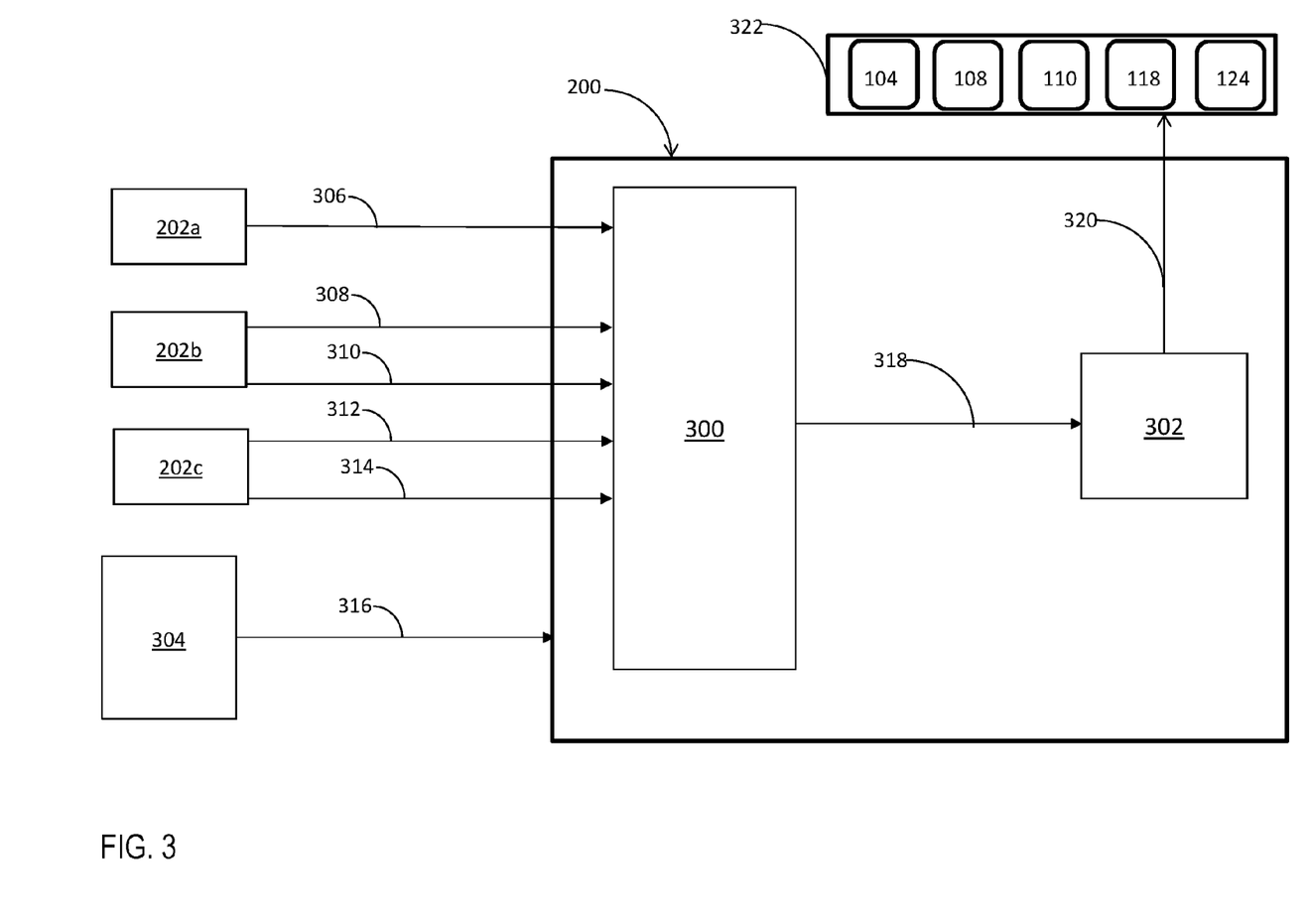
FIG. 3 is a block diagram of an electronic braking control module (EBCM) configured to control a powertrain system of a vehicle based on a vehicle scenario according to a non-limiting embodiment.

Referencing FIG. 3 with continued reference to FIG. 2, the vehicle 100 provides a powertrain control system including an electronic control module such as, for example, an electronic braking control module (EBCM) 200 in signal communication with one or more electronic sensors 202a-202c that monitor one or more characteristics or operating parameters of the vehicle 100. The sensors 202a-202b may include, but are not limited to, a steering system sensor 202a, a front wheel sensor 202b, and a rear wheel sensor 202c. The data provided by the sensors 202a-202c may be used to determine various driving characteristics or operating parameters of the vehicle 100. For example, the steering system sensor 202a is configured to monitor the angle of the front and/or rear wheels 112 and 114. The front wheel sensor 202b is configured to monitor rotational speed, acceleration/deceleration, and/or direction (i.e., forward/reverse) of the front wheels 112. In a similar manner, the rear wheel sensor 202c is configured to monitor is configured to monitor rotational speed, acceleration/deceleration, and/or direction (i.e. forward/reverse) of the rear wheels 114. Although single sensors 202b-202c are shown corresponding to the front and rear wheels 112 and 114, respectively, it should be appreciate that each wheel may be monitored by a respective wheel sensor.

In addition to the data directly provided by the sensors 202a-202c, the EBCM 200 is configured to calculate one or more additional driving characteristics or operating parameters. For example, the EBCM 200 can utilize the speed and or acceleration data provided by the front wheel sensor 202b and/or the rear wheel sensor 202c to determine the later acceleration of the vehicle 100, the longitudinal acceleration of the vehicle 100 and/or the yaw rate of the vehicle 100. In at least one embodiment, the vehicle 100 may include an inertial measurement unit (IMU) configured to measure and determine the velocity, orientation, and/or gravitational forces realized by the vehicle 100 using a combination of accelerometers, gyroscopes and/or magnetometers. The data gathered by the IMU (not shown in FIG. 1) may be communicated to the EBCM 200 such that the environment of the vehicle 100, and/or one or more driving scenarios of the vehicle 100 can be determined as discussed in greater detail below. The IMU may also operate according to global positioning satellite (GPS) data. The GPS data can, in turn, be communicated to the EBCM 200. Accordingly, the EBCM 200 can determine the position of the vehicle 100 using various methods including, but not limited to, dead reckoning.

Based on the data output from the sensors 202a-202c and/or the IMU, the electronic EBCM 200 is configured to determine the environment of the vehicle 100, and/or one or more scenarios of the vehicle 100. The EBCM 200 is also configured to identify one or more driveline components that may be susceptible to excessive stress caused by the current environment and/or current driving scenario. In this manner, the vehicle EBCM 200 can actively generate an input torque limiting control signal that adjusts the input torque applied to the driveline system (e.g., the transfer case, front differential, rear differential, etc.) to prevent stress or damage to one or more driveline components. For example, the input torque can be limited by adjusting clutches in the transmission, controlling the torque converter and/or controlling the engine.

For instance, the EBCM 200 may receive orientation data from the IMU indicating the vehicle 100 is positioned on a steep hill or incline, and may receive data from the one or more wheel sensors 202b-202c indicating that the vehicle 100 is moving backwards. In this manner, the EBCM 200 determines that the vehicle 100 is attempting to reverse up a steep incline surface, which in turn will cause excessive stress on the front wheel axles 126a-126b. In an attempt to reduce the stress on the front wheel axles 126a-126b, the EBCM 200 outputs the torque limiting control signal which limits torque delivered to the front differential 124. Torque delivered to the front differential 124 can be achieved in various manners including, but not limited to, controlling operation of the engine 104, and controlling operation of the transmission 108, and/or controlling the transfer case 110 so as to limit the torque delivered to the differential.

In addition, the EBCM 200 may identify particular driveline components susceptible to excessive stress. In at least one embodiment, for example, the EBCM 200 receives data from the steering sensor 202a indicating the front wheels 112 are turned, thereby placing more stress on the right front wheel 112, for example, than the left front wheel 112. In this case, the EBCM 200 may apply greater torque limitations to the right front wheel compared to the front left wheel. In this manner, excessive stress on the right front wheel and/or right front axle caused by input torque may be reduced.

Turning to FIGS. 2A-2B, are non-limiting diagrams illustrating a vehicle 100 existing at static equilibrium in various vehicle scenarios. The diagrams illustrate the normal forces realized by the front and rear axles as the vehicle orientation changes according to different surface grades. Referencing FIG. 2A, a first vehicle scenario is illustrated where the vehicle 100 is located on a flat or substantially flat surface 206. In this instance, the front normal force ($F_f$) applied to the front wheel 112 and the rear normal force ($F_r$) applied to the rear wheel 114 are parallel or substantially parallel with respect to the normal gravitational force (W) realized by the vehicle 100, but are applied in opposite directions with respect to the normal gravitational force (W). In addition, the normal gravitational force (W), the front normal force ($F_f$) and the rear normal forces ($F_f$-$F_r$) are also perpendicular or substantially perpendicular to the surface 206. In at least one embodiment, the orientation of the vehicle 100 may be provided to the EBCM 200 via the IM. The various forces realized by the vehicle 100 in the first scenario may be described as follows:

the sum of the forces in the horizontal direction of the vehicle 100 (e.g., along the X-axis) is zero, i.e. $\Sigma F_x=0$, where $F_{fr}=0$;

the sum of the forces in the vertical direction of the vehicle 100 (e.g., along the Z-axis) is zero, i.e., $\Sigma z=0$, where $F_f+F_r-W=0$; and the sum of moments about point a of the vehicle 100 is zero, i.e., $\Sigma M_\alpha=0$, where $[Fr*(\beta+\delta)-W*\beta]=0$. The term $\beta$ refers to the distance between the front wheel axle 126 and the center of gravity 208 of the vehicle 100, and the term δ refers to the distance between the rear wheel axle 120 and the center of gravity 208 of the vehicle 100.

Referring now to FIG. 2B, a second vehicle scenario is illustrated where the vehicle 100 is located on an inclined surface 210. In this instance, the front normal force ($F_f$) applied to the front wheel 112 and the rear normal force ($F_r$) applied to the rear wheel 114 still perpendicular or substantially perpendicular with the inclined surface 208, but are not longer parallel or substantially parallel with respect to the normal gravitational force (W). In at least one embodiment, the forces and orientation of the vehicle may be provided to the EBCM 200 via the IMU. The various forces realized by the vehicle 100 in the second scenario may be described as follow:

the sum of the forces in the horizontal direction of the vehicle 100 (e.g., along the X-axis) is zero, i.e., $\Sigma F_x=0$, where $F_{fr}-(W)\sin(\theta)=0$;

the sum of the forces in the vertical direction of the vehicle 100 (e.g., along the Z-axis) is zero, i.e., $\Sigma Fz=0$, where $F_f-(W)\cos(\theta)=0$; and the sum of moments about point a of the vehicle 100 is zero, i.e., $\Sigma M_\alpha=0$, where $[(F_f)(\beta+\delta)+(W)\sin(\theta)*\gamma-(W)\cos(\theta)(\beta)]=0$. The term β refers to the distance between the front wheel axle 126 and the center of gravity 208 of the vehicle 100, and the term δ refers to the distance between the rear wheel axle 120 and the center of gravity 208 of the vehicle 100. The term γ refers to the vertical (perpendicular) distance between the center of gravity 208 and the arbitrary point at which moments are being summed about a.

Turning to FIG. 3, an EBCM 200 configured to actively limit driveline input torque based on the various vehicle scenarios experienced by the vehicle 100 is illustrated according to a non-limiting embodiment. The EBCM 200 includes an electronic vehicle scenario detection module 300 and a torque limiting module 302. The vehicle scenario detection module 300 is configured to actively determine one or more vehicle scenarios based on data provided by a respective vehicle sensor 202a-202c and/or the IMU 304.

For instance, the steering system sensor 202a may output a steering signal 306 indicating a rotational angle of the steering wheel 115. In this manner, the vehicle scenario detection module 300 can determine whether the front wheels and/or rear wheels are turned. The front wheel sensor 202b may output a front wheel speed signal 308 indicating a rotational speed of the front wheels 112. The front wheel sensor 202b may also output a front wheel direction signal 310 indicating the direction (i.e. forward or reverse) of the front wheels 112. In this manner, the vehicle scenario detection module 300 can determine the speed of the front wheels 112, and the moving direction of the front end of the vehicle and/or the vehicle 100 in general. Similarly, the rear wheel sensor 202c may output a rear wheel speed signal 312 indicating a rotational speed of the rear wheels 114. The rear wheel sensor 202c may also output a rear wheel direction signal 314 indicating the direction (i.e. forward or reverse) of the rear wheels 114. In this manner, the vehicle scenario detection module 300 can determine the speed of the rear wheels 114, and the moving direction of the rear end of the vehicle and/or the vehicle 100 in general. The IMU 304 may output one or more inertial signals 316 indicating various characteristics or parameters of the vehicle 100 including, but not limited to, lateral acceleration, longitudinal acceleration, yaw rate, vehicle angle with respect to the driving surface, gravity force, and GPS data. Accordingly, the vehicle scenario detection module 300 can determine various scenarios of the vehicle 100 including, but not limited to, vehicle orientation with respect to the driving surface, the inclination of the vehicle 100, the intensity of the inclination, and the stress applied to one or more driveline components.

The vehicle scenario detection module 300 is in signal communication with the torque limiting module 302 and generates a wheel-to-surface signal 318 indicating the current scenario of the vehicle (e.g., the angle of one or more vehicle wheels with respect to the driving surface) based on the data provided by the signals 306-316. For example, the vehicle scenario detection module 300 may determine a scenario where the vehicle is moving backwards up a steep incline surface, which in turn will cause excessive stress on various driveline components such as, for example, the front wheel axles, front wheel bearings, front differential, front drive shaft, etc. The vehicle scenario detection module 300 may then generate a wheel-to-surface signal 318 indicating the current inclination of the front and/or rear wheels and the moving direction of the vehicle. The torque limiting module 302 receives the wheel-to-surface signal 318 and actively computes an active skid-torque value. In at least one embodiment, the active skid-torque value is associated with the front wheels and/or the rear wheels.

The skid-torque value is compared to a skid-torque threshold value determined by the torque limiting module 302. When the skid-torque value exceeds the skid-torque threshold value, the torque limiting module 302 outputs one or more torque limiting control signals 320 that controls (e.g., limits) the powertrain system 322 so as to limit the input torque to one or more driveline components of the vehicle's driveline system. For example, the torque limiting module 302 can output one or more torque limiting control signals that modifies operation of the engine 104, slips a clutch of the transmission 108, controls torque distribution by the transfer case 110, and/or controls operation of the rear and/or front differentials 118 and 124, respectively, to adjust torque output from the transmission 108, i.e., the input torque delivered to the driveline system. Thus, unlike conventional vehicle systems which employ a static or fixed skid-torque limit value irrespective of the current scenario of the vehicle (e.g., the inclination of the vehicle), at least one embodiment actively determines a current scenario of the vehicle, such as the inclination or gradient of the wheels with respect to the driving surface, and actively generates a skid-torque value in real-time based on the current scenario of the vehicle.

In at least one embodiment, the torque limiting module 302 is configured to actively adjust the skid-torque threshold value based on the current scenario of the vehicle. For instance, the torque limiting module 302 can generate a first skid-torque threshold value in response to the wheel-to-surface signal 318 indicating that the vehicle is located on a flat or substantially flat surface. When, however, the vehicle is moved to an inclined surface, the torque limiting module 302 may determine the degree of inclination with respect to one or more of the wheels, and compute an adjusted (i.e., different) skid-torque threshold value based on the degree of inclination indicated by the wheel-to-surface signal 318.

In at least one embodiment, the torque limiting module 302 may generate individual skid-torque threshold values for each individual driveline component and/or each vehicle wheel (e.g., the front left wheel, front right wheel, rear left wheel and rear right wheel). For example, the torque limiting module may generate a first skid-torque value corresponding to a first driveline component (e.g., the rear differential 118) and a different second skid-torque value corresponding to a second driveline component (e.g., the front differential 124). In this manner, the torque limiting module 302 can actively adjust each skid-torque threshold value independently of one another based on the current scenario of the vehicle as described above. Accordingly, torque output efficiency is vastly improved compared to conventional vehicle powertrain systems that utilize a static or fixed torque-skid limiting system.

In at least one embodiment, the powertrain control system may revert to a default fixed torque value in response to detecting a fault condition. If, for example, an invalid input signal or input signal fault were to exist, the EBCM 200 may default to a fixed driveline input torque limit which was determined via worst-case scenario skid-torque values (such as how current driveline input torque limits are established).

Figure 4:
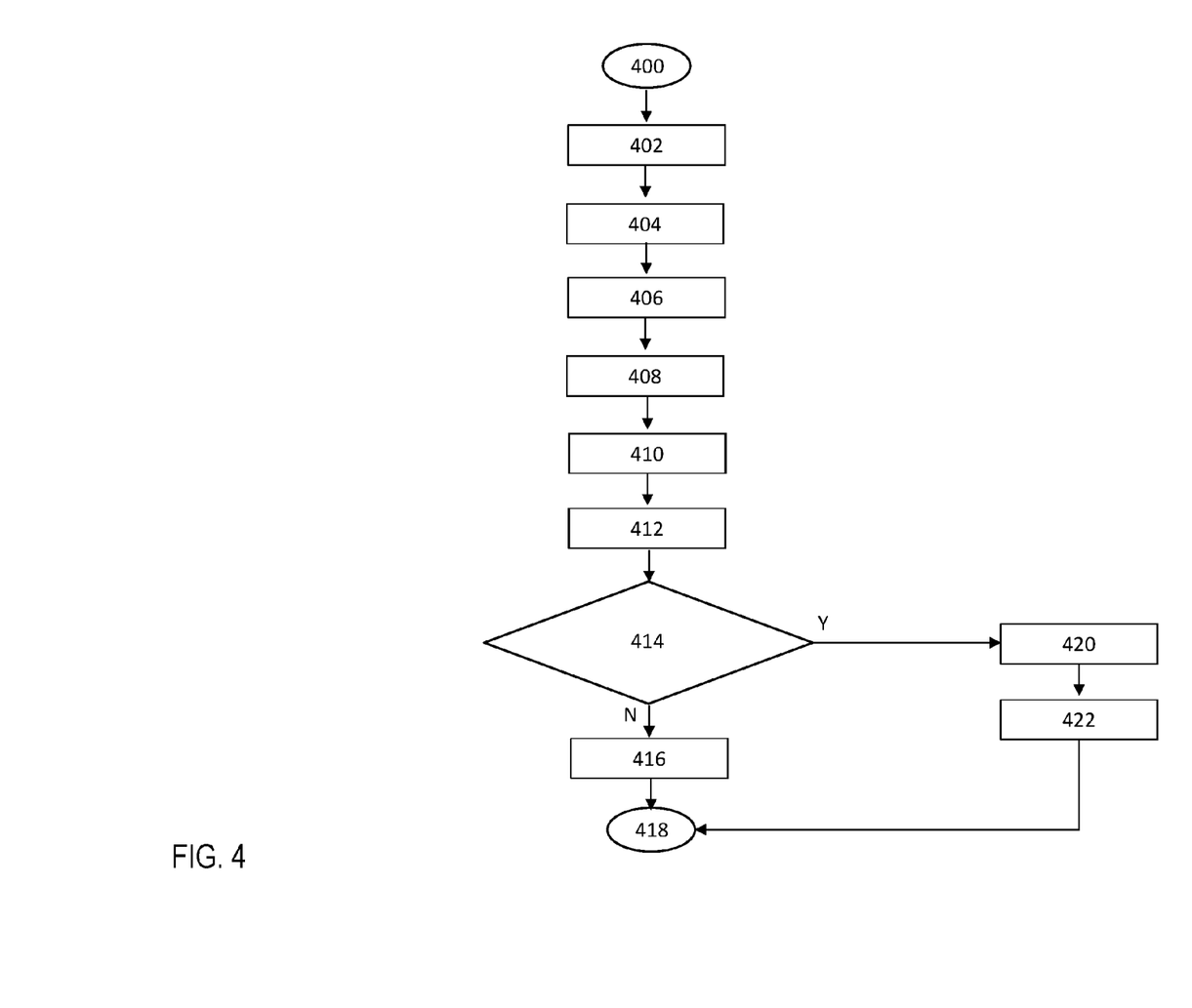
FIG. 4 is a flow diagram illustrating a method of controlling a powertrain system included in a vehicle according to a non-limiting embodiment.

Turning now to FIG. 4, a method of controlling a powertrain system included in a vehicle is illustrated according to a non-limiting embodiment. The method starts at operation 400 and at operation 402 a wheel angle of the front and/or rear wheels of the vehicle are determined. According to a non-limiting embodiment, the wheel angle is based on a rotational angle of the vehicle steering wheel. At operation 404, the rotational direction of the front and/or rear wheels is determined. At operation 406, the rotational speed of the front and/or rear wheels is determined. The rotational direction and/or rotational speed may be determined, for example, using sensors coupled to one or more of the wheels. At operation 408, inertial data of the vehicle is determined. The inertial data may be provided by an IMU and may include, but is not limited to, lateral acceleration, longitudinal acceleration, yaw rate, vehicle angle with respect to the driving surface, gravity force, and GPS data.

Turning to operation 410, a current vehicle scenario is determined based on the wheel angle, wheel speed, wheel rotation, and/or inertial data. At operation 412, skid-torque data is determined based on the vehicle scenario. When the skid-torque data is equal to or less than a skid-torque threshold 141, the current input torque is maintained at operation 416, and the method ends at operation 418. When, however, the skid-torque data exceeds the skid-torque threshold, one or more driveline components susceptible to stress or damage is identified at operation 420. At operation 422, the input torque is modulated or adjusted so as to reduce or prevent damage to one or more driveline components, and the method ends at operation 418.

Accordingly, various non-limiting embodiments described above provide a powertrain control system configured to actively control driveline input torque (i.e., transmission output) based on the current vehicle scenario such as, for example, the surface grade and/or orientation of the vehicle. In this manner, the appropriate input torque may be actively provided during a wider range of vehicle scenarios compared to conventional powertrain systems. In addition, unnecessary limitations on input torque may be avoided so as to increase torque output efficiency and improve overall vehicle performance.

The various embodiments described above are merely exemplary in nature and are not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a hardware computer processor (shared, dedicated, or group) and memory that executes one or more software or firmware programs, a combinational logic circuit, a microcontroller, and/or other suitable components that provide the described functionality.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle including a powertrain control system, comprising:
   a transmission configured to transfer torque to a first driveline component of the vehicle and a second driveline component of the vehicle different from the first driveline component;
   at least one electronic sensor configured to output a signal indicative of at least one operating parameter of the vehicle;
   an electronic vehicle scenario detection module configured to determine a current vehicle scenario of the vehicle based on the at least one operating parameter; and
   an electronic control module including a computer processor configured to actively determine a first active skid-torque value of the first driveline component in real-time based on the current vehicle scenario, and a second active skid-torque value of the second driveline component in real-time based on the current vehicle scenario,
   wherein the control module actively varies a first skid-torque threshold value of the first driveline component based on the current vehicle scenario, and actively varies a second skid-torque threshold value of the second driveline component independently from the first skid-torque threshold value based on the current vehicle scenario, and compares the first and second active skid-torque values to the first and second skid-torque threshold values, respectively, and
   generates a first torque limiting control signal in response to the first active skid-torque value exceeding the first skid-torque threshold value so as to limit a first torque input to the first driveline component, and a second torque limiting control signal in response to the second active skid-torque value exceeding the second skid-torque threshold value so as to limit a second torque input to the second driveline component independently from the first driveline component.

2. The vehicle of claim 1, wherein the control module limits the torque input to the first driveline component independently with respect to the torque input to the second driveline component.

3. The vehicle of claim 2, wherein an engine installed on the vehicle generates the torque, and the at least one driveline component includes a transfer case, a torque converter, a front differential and a rear differential.

4. The vehicle of claim 1, wherein the current vehicle scenario includes a gradient of the vehicle with respect to a surface supporting the vehicle.

5. The vehicle of claim 4, wherein the gradient of the vehicle is based on the gradient of at least one wheel with respect to the surface.

6. The vehicle of claim 5, wherein the gradient of at least one wheel is based on the at least one operating parameter, the at least one operating parameter including at least one of steering direction of the at least one wheel, rotational direction of the at least one wheel, rotational speed of the at least one wheel, yaw rate of the vehicle, lateral acceleration of the vehicle, and longitudinal acceleration of the vehicle.

7. The vehicle of claim 6, wherein the torque limiting control signal adjusts operation of at least one of the internal combustion engine and the transmission so as to limit the torque input to the at least one driveline component.

8. A powertrain control system included in a vehicle having an internal combustion engine, the powertrain control system comprising:
   at least one electronic sensor configured to output a signal indicative of at least one operating parameter of the vehicle;
   an electronic vehicle scenario detection module including a computer processor configured to determine a current vehicle scenario of the vehicle based on the at least one operating parameter; and
   torque limiting module including a computer processor configured to actively determine a first active skid-torque value of the first driveline component in real-time based on the current vehicle scenario, and a second active skid-torque value of the second driveline component in real-time based on the current vehicle scenario,
   wherein the control module actively varies a first skid-torque threshold value of the first driveline component based on the current vehicle scenario, and actively varies a second skid-torque threshold value of the second driveline component independently from the first skid-torque threshold value based on the current vehicle scenario, and compares the first and second active skid-torque values to the first and second skid-torque threshold values, respectively, and
   generates a first torque limiting control signal in response to the first active skid-torque value exceeding the first skid-torque threshold value so as to limit a first torque input to the first driveline component, and a second torque limiting control signal in response to the second active skid-torque value exceeding the second skid-torque threshold value so as to limit a second torque input to the second driveline component independently from the first driveline component.

9. The powertrain control system of claim 8, wherein the current vehicle scenario includes a gradient of the vehicle with respect to a surface supporting the vehicle.

10. The powertrain control system of claim 9, wherein the gradient of the vehicle is based on the gradient of at least one wheel with respect to the surface.

11. The powertrain control system of claim 10, wherein the gradient of at least one wheel is based on the at least one operating parameter, the at least one operating parameter including at least one of steering direction of the at least one wheel, rotational direction of the at least one wheel, rotational speed of the at least one wheel, yaw rate of the vehicle, lateral acceleration of the vehicle, and longitudinal acceleration of the vehicle.

12. The powertrain control system of claim 11, wherein the torque limiting control signal adjusts operation of at least one of the internal combustion engine and a transmission of the vehicle to limit the torque input to the at least one driveline component.

13. A method of controlling a powertrain system included in a vehicle, the method comprising:
   generating torque via an engine to drive the vehicle;
   transferring the torque, via a transmission, to a first driveline component of the vehicle and a second driveline component of the vehicle different from the first driveline component;
   outputting an electronic signal indicating at least one operating parameter of the vehicle;
   determining a current vehicle scenario of the vehicle based on the at least one operating parameter;
   actively determining a first active skid-torque value of the first driveline component in real-time based on the current vehicle scenario, and actively determining a second active skid-torque value of the second driveline component in real-time based on the current vehicle scenario;
   actively varying a first skid-torque threshold value of the first driveline component based on the current vehicle scenario, and actively varying a second skid-torque threshold value of the second driveline component independently from the first skid-torque threshold value based on the current vehicle scenario;
   comparing the first and second active skid-torque values to the first and second skid-torque threshold values, respectively;
   generating a first torque limiting control signal in response to the first active skid-torque value exceeding the first skid-torque threshold value so as to limit a first torque input to the first driveline component, and
   generating a second torque limiting control signal in response to the second active skid-torque value exceeding the second skid-torque threshold value so as to limit a second torque input to the second driveline component independently from the first driveline component.

* * * * *